July 16, 1929.    D. BAUTZ    1,720,755
PORTABLE MEASURING CONTAINER
Filed Oct. 22, 1927    2 Sheets-Sheet 1

INVENTOR.
Daniel Bautz
BY
Erwin Wheeler & Woolard
ATTORNEYS.

July 16, 1929.    D. BAUTZ    1,720,755
PORTABLE MEASURING CONTAINER
Filed Oct. 22, 1927    2 Sheets-Sheet 2

INVENTOR.
Daniel Bautz
BY Erwin Wheeler & Woodard
ATTORNEYS

Patented July 16, 1929.

1,720,755

UNITED STATES PATENT OFFICE.

DANIEL BAUTZ, OF MILWAUKEE, WISCONSIN.

PORTABLE MEASURING CONTAINER.

Application filed October 22, 1927. Serial No. 227,910.

My invention relates to improvements in portable measuring containers.

The primary object of my invention is to provide a portable container for liquids with a gage which may be officially adjusted from time to time to exactly indicate the quantity of liquid in the container and readjusted to correspond with variations in capacity due to distortion of the container wall; to provide for officially sealing the adjustable portion of the gage to prevent unauthorized readjustments thereof; to provide such a container with gage protecting devices which may also serve as handles to facilitate transportation and delivery of the contents; to provide such a container with suitable leveling indicators to ensure the accuracy of the gage measurements; and in general to provide a convenient, durable and reliable means for measuring and delivering dispensed liquids and allowing the purchaser to ascertain by inspection that the quantity ordered or charged for is actually delivered.

In the drawings.

Like parts are identified by the same reference characters throughout the several views.

Figure 1:
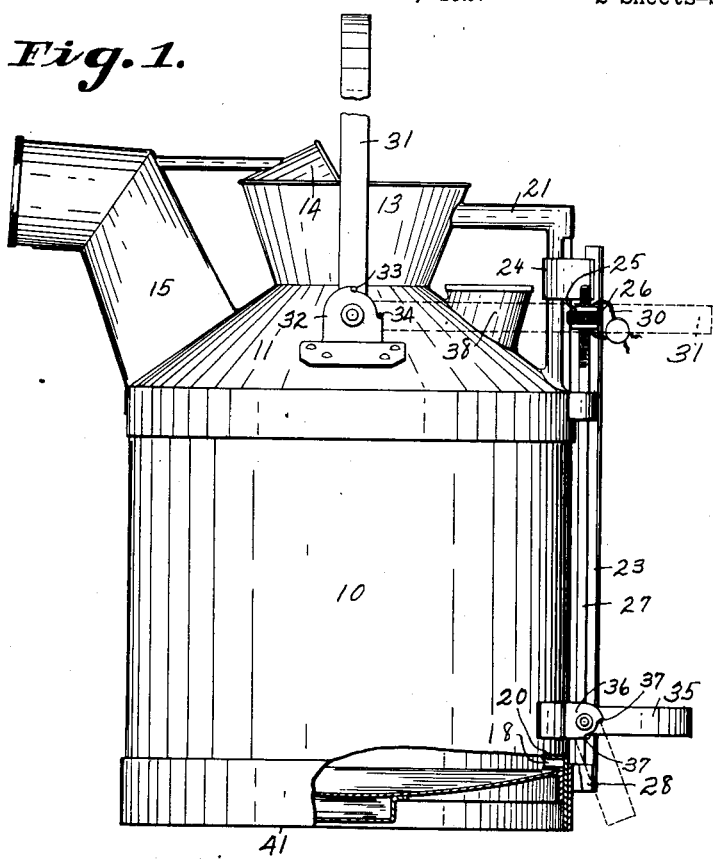
Figure 1 is a side elevation of a container embodying my invention.
Figure 2:
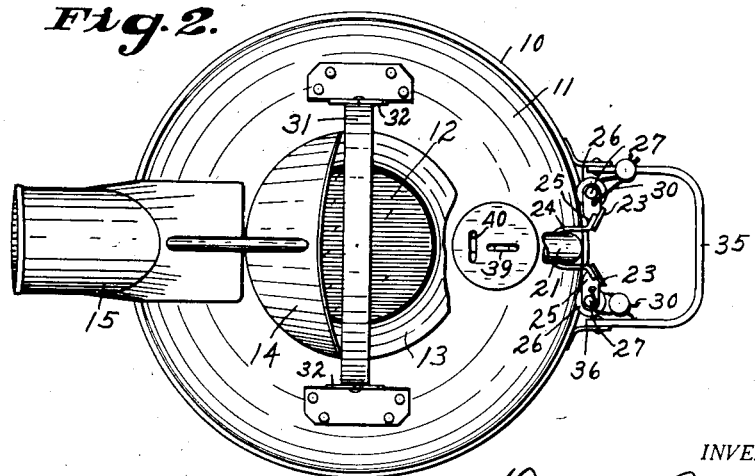
Figure 2 is a plan view of the same.
Figure 3:
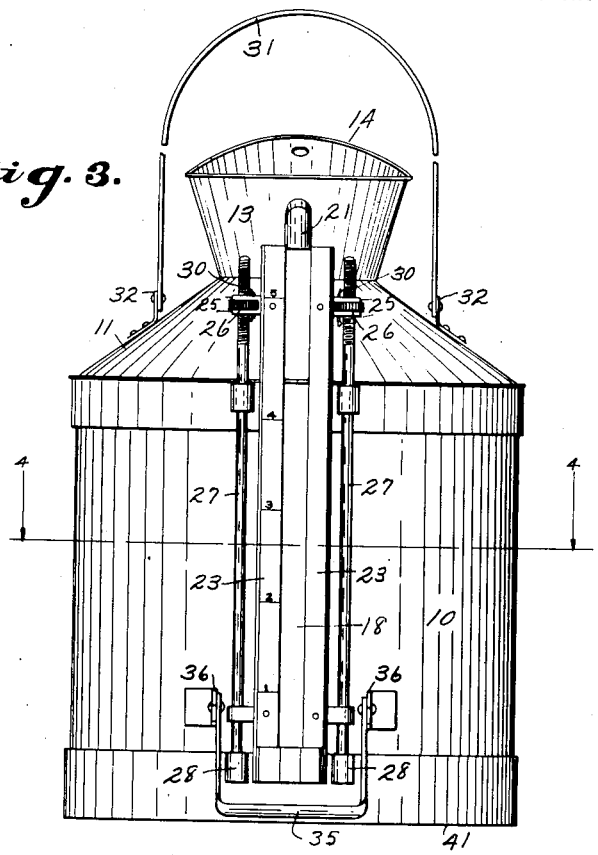
Figure 3 is a rear elevation.
Figure 4:
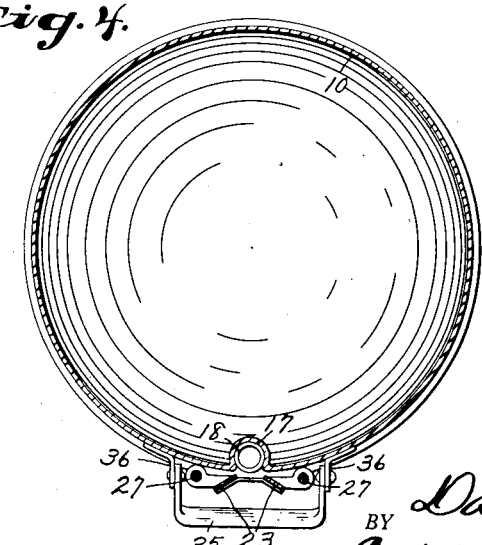
Figure 4 is a sectional view drawn to line 4—4 of Figure 3.

The body 10 of the container is of a generally cylindrical form, with a conical or dome like top 11 provided with a central aperture 12 flanked by a flaring wall or receiving funnel 13 partially covered at 14 on the side occupied by the pouring spout 15. These parts may be of any ordinary construction but for the purposes of my invention I preferably bend or fold the cylindrical wall of the body inwardly to form a vertical cylindrical channel 17, open along the outer side and adapted to receive a sight glass tube 18. At its lower end this sight glass tube is seated and sealed in a cavity 20 which is open to the bottom portion of the container on the inner side, and at its upper end this tube is received in a duct 21 which is elbowed and preferably extended through the flaring wall 13 to prevent the formation of an air pocket while returning any liquid to the receptacle that might splash or surge through this duct, when the container is being transported or manipulated for delivery purposes.

Vertically adjustable index bars 23 flank the sight glass tube at each side of the opening of the cylindrical channel in which it is mounted. The upper end portions of these index bars are connected with each other by a U-shaped cross bar or plate 24 the central portion of which curves about the inner side of the vertical portion of the tube 21. The index bars are also provided with pairs of ear brackets 25 between which nuts 26 are mounted and threaded upon supporting posts 27 which extend through apertures in the bracket ears. The posts 27 are rigidly supported from the container wall by brackets 28 to which they are permanently attached.

The ear brackets are also apertured to receive a sealing wire 30, whereby the nuts have been adjusted to fix the position of the index bars, the nuts may be drilled by the official tester in registry with their sealing wire apertures and the wire passed through and sealed as shown.

A bail 31 is pivoted to suitable ears 32, connected with the top 11 and provided with stop pins 33 to engage a stop shoulder 34 on the ears to limit the movement of the bail while allowing it to swing to a protecting position over the upper end of the sight glass tube as shown by dotted lines in Figure 1. Similarly, a bail shaped handle 35 is pivoted to ears 36 on the lower portion of the container at opposite sides of the sight glass tube, and the stops 37 on these ears hold the bail normally in a position to protect the sight glass.

The top 11 of the container is provided with a projection 38 having a flat upper surface provided with two levels 39 and 40 disposed at right angles to each other and so located as to indicate the position of the container with reference to a horizontal plane. The upper surface of the projection 38 is parallel with the lower margin of the bottom flange 41 and therefore the air bubbles of the levels will center themselves when the container is placed on a horizontal surface, or suspended from its upper bail with its bottom in a horizontal position.

I claim:

1. In a portable measuring container, a vertically extending sight glass along one side of the container, index bars disposed upon opposite sides of the glass, vertically extending supporting posts secured to the container at the respective sides of the index bars and having threaded portions from which such bars may be supported, nuts rotatably engaging said bars and threaded upon said posts, and means for sealing the nuts to retain them in one of their positions of relative rotation and thereby support the index bars from said posts in a desired position relative to said glass.

2. A portable measuring container provided with a bail connected to its top portion and another bail connected to its side portion near the lower end, a sight glass in communication with the lower end of the container and normally protected by said bails, means including stops for holding said bails normally in glass protecting position, and index bars flanking the sight glass.

3. In a container, a measuring gage including a glass tube extending vertically along the exterior wall of the container, a bail pivotally mounted upon the top of the container and adapted in one position to extend about the upper end of the glass tube, and a second bail pivotally mounted upon the lower end of the container and adapted in one position to extend about the lower end of the tube.

4. In a container, a measuring gage including a glass tube and adjustable index bars extending vertically of the exterior wall of the container, bail supports on the top of the container upon opposite sides of the gage, a U-shaped bail having each end pivotally mounted on one of the bail supports, bail supports on the lower end of the container upon opposite sides of the gage, a U-shaped bail having each end pivotally mounted on one of the last mentioned bail supports, and means on the bail supports and bails for defining the limits of bail movement about their respective pivots.

DANIEL BAUTZ.